C. WILER.
MEANS FOR MEASURING CURRENT IN THREE PHASE SYSTEMS.
APPLICATION FILED JAN. 7, 1909.
977,061.
Patented Nov. 29, 1910.
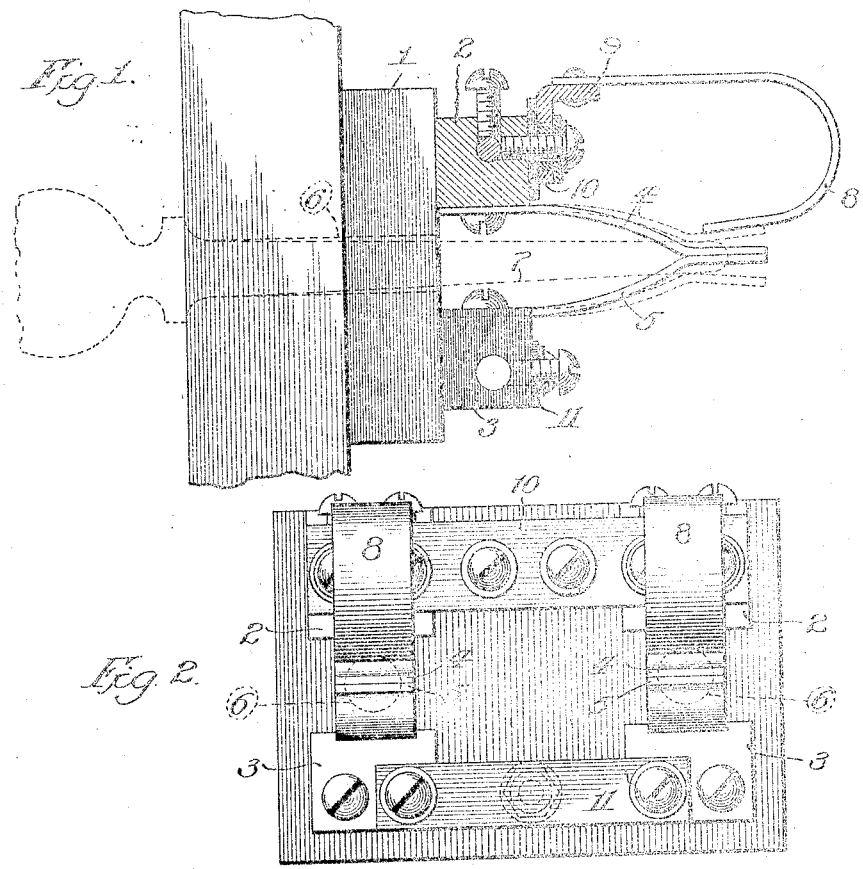
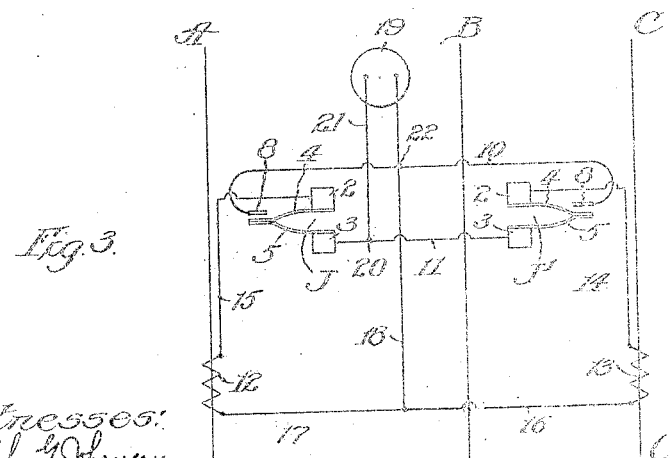
Witnesses:
Ralph T. Johansen,
Irving MacDonald
Inventor:
Carl Wiler
by J. C. Ames Atty

UNITED STATES PATENT OFFICE.

CARL WILER, OF CHICAGO, ILLINOIS, ASSIGNOR, BY MESNE ASSIGNMENTS, TO GENERAL ELECTRIC COMPANY, A CORPORATION OF NEW YORK.

MEANS FOR MEASURING CURRENT IN THREE-PHASE SYSTEMS.

977,061.      Specification of Letters Patent.      Patented Nov. 29, 1910.

Application filed January 7, 1909. Serial No. 471,166.

*To all whom it may concern:*

Be it known that I, CARL WILER, a citizen of the United States, residing at Chicago, in the county of Cook and State of Illinois, have invented a certain new and useful Improvement in Means for Measuring Current in Three-Phase Systems, of which the following is a full, clear, concise, and exact description.

The object of my invention is to simplify the apparatus and circuit arrangement employed for measuring the current in each of the mains of a three-phase alternating current system.

Heretofore it has been customary to associate four jacks in circuit with two transformers and an ammeter in such a manner that it is necessary to insert a plug in each of two jacks in order to bring the ammeter in circuit to measure the current in any one of the phases of a three-phase system.

My invention consists in providing only two jacks or switches and so connecting said switches in the circuit that during the closed positions of both of them, the secondary terminals of two transformers, one in each of two mains, are connected in parallel with the ammeter, and when only a single one of said switches is closed a single transformer is connected in circuit with the ammeter. When said transformers are connected in parallel, as above described, the ammeter, of course, measures the resultant current of the two phases, which in a three-phase system equals the current in the third phase. When the ammeter is connected in circuit with the secondary of only one transformer, it of course measures the current in the main in which the primary of the transformer is included.

The several features of my invention so far as they relate to the apparatus or to the circuit arrangement employed may be more readily understood by reference to the accompanying drawings, in which—

Figure 1 is a side elevation, partly in section, of the switch apparatus; Fig. 2 is a front elevation thereof; and Fig. 3 is a diagram of the circuit and apparatus of my invention.

Like parts are designated by similar reference characters in the several views.

Secured upon the face of a mounting base 1 of slate or other suitable material are two pairs of terminals, each pair consisting of an upper terminal block 2 and a lower terminal block 3, suitably spaced apart. Secured upon the opposing faces of the terminal blocks 2 and 3 are the contact springs 4 and 5, respectively, such springs being of the usual form employed for the contact springs of jacks, their free ends being normally in engagement as shown in full lines in Fig. 1. A hole 6 in the base 1 between the blocks 2 and 3 permits of the insertion of a plug 7 of fiber or other insulating material, for the purpose of separating the springs 4, 5, as indicated in dotted lines in Fig. 1.

A curved contact spring 8 is arranged in position to be engaged by the spring 4 when the plug 6 is inserted in the jack. Two of these springs 8 are employed, one coöperating with each of the springs 4, 4. Said springs 8 are mounted upon horizontal flanges 9 at each end of a conducting bar or strap 10 which serves to electrically connect said springs 8, 8. Said bar or strap is mounted upon the front faces of the blocks 2, but is insulated therefrom. The terminal blocks 3, 3 are electrically connected by a bar or strap 11.

It will be observed that the apparatus just described provides two similar jacks J and J′, such number sufficing, with the circuit arrangement which will now be described, to afford means for measuring the current in each of the mains of a three-phase system.

Referring to Fig. 3, A, B and C are the three mains of the three-phase alternating current system. The mains A and C are provided with transformers 12 and 13, respectively. One terminal of the secondary of each transformer is connected to a corresponding terminal block 2 through conductors 14 and 15, respectively. The other terminals of said secondaries are connected through the conductors 16 and 17, respectively, to a common conductor 18, which leads to one terminal of an ammeter 19. The other terminal of said ammeter is connected at 20 with the bar or strap 11 by a conductor 21. The conductor 18 is connected at 22 to the strap 10. It will thus be observed that the secondaries of the transformers 12 and 13 are in parallel, normally closed branches of the circuit of the ammeter 19. Said circuit may be traced as follows: from the ammeter 19 through conductor 21 to the point 20, where the circuit divides into two parallel branches, one of which extends through terminal block 3, springs 5 and 4, conductor 15, transformer 12, conductor 17 to conductor 18. The other branch may be similarly traced through the transformer 13. The common return conductor 18 leads to the other terminal of the ammeter 19. The transformers being thus connected in parallel, the ammeter 19 measures the resultant current of the phases A and C, which resultant equals the current of the phase B. Hence to read the current in phase B the plug is left out of both jacks J and J'.

To read the current in phase A, the plug is inserted in jack J', thus opening, at the contact springs 4, 5, the parallel branch which includes the transformer 13. Since the ammeter is then in circuit with the transformer 12 only, it measures the current in phase A. Likewise to measure the current in phase C the plug is inserted in jack J.

It will be observed that as a protection to the transformer, which is located in the branch opened by the insertion of a plug, a short circuit of the secondary thereof is closed when the plug is inserted. For example, when the plug is inserted in the jack J' a short circuit of the transformer 13 is closed from one terminal thereof through the conductor 14, terminal block 2, springs 4 and 8, strap 10 and conductors 18 and 16 to the other terminal of the transformer 13. Thus each jack comprises two springs 4, 5 normally in contact but adapted to be spread apart by the insertion of a plug 7. When spread apart the spring 4 engages with a contact spring 8 mounted upon a bar 10, common to the springs 4, 4 of both jacks, and short circuits one of the transformers, thus leaving the ammeter in circuit with the other transformer only.

My invention is particularly adaptable to high tension alternating current systems in which the current to be measured is brought through instrument transformers to jacks and ammeters mounted on remote control switchboards.

It will be understood that the arrangement shown and described is susceptible to modification without departing from my invention.

I claim:—

1. The combination with the mains of a three phase alternating current system, of a transformer in two of said mains, an electrical measuring instrument, a pair of switches each consisting of spring members normally in contact to connect the transformers in parallel through the instrument, an auxiliary member for each switch, and a plug for separating said members and simultaneously causing one of them to make contact with an auxiliary member to short circuit the corresponding transformer.

2. The combination with the mains of a three phase alternating current system, of a transformer in two of said mains, an electrical measuring instrument, a pair of switches each consisting of spring members normally in contact to connect the transformers in parallel through the instrument, and a plug for separating the members of each switch.

3. Circuit controlling mechanism consisting of a switch board, a pair of jacks mounted thereon, each provided with a pair of normally closed springs arranged to be opened by the insertion of a plug in the jack, a bar permanently connecting a corresponding spring of each jack, and a second bar extending between said other springs and arranged to be electrically connected with either of the same when the plug is inserted in the corresponding jack.

4. Means for measuring the current in each of the phases of a three-phase alternating current system, said means comprising a pair of jacks each provided with a pair of normally closed springs arranged to be opened by the insertion of a plug in the jack, a bar permanently connecting a corresponding spring of each jack, a second bar extending between said other springs and arranged to be electrically connected with either of the same when the plug is inserted in the corresponding jack, transformers included in the circuit of two of said phases, each transformer having one terminal of its secondary connected to one of said last-mentioned springs, and a measuring instrument having one of its terminals connected to said first-mentioned bar and its other terminal connected to said second bar and to the other terminals of the secondaries of said transformers.

In witness whereof, I, hereunto subscribe my name this 4th day of December A. D., 1908.

CARL WILER.

Witnesses:
R. E. McEwen,
Julia K. Munroe.